United States Patent
Zhang et al.

(10) Patent No.: US 11,674,653 B2
(45) Date of Patent: Jun. 13, 2023

(54) HEADLIGHT OPTICAL ELEMENT, HEADLIGHT MODULE, VEHICLE HEADLIGHT AND VEHICLE

(71) Applicant: HASCO VISION TECHNOLOGY CO., LTD., Shanghai (CN)

(72) Inventors: Dapan Zhang, Shanghai (CN); Zhiping Qiu, Shanghai (CN); He Zhu, Shanghai (CN); Hui Li, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 461 days.

(21) Appl. No.: 17/046,582

(22) PCT Filed: Sep. 27, 2019

(86) PCT No.: PCT/CN2019/108398
§ 371 (c)(1),
(2) Date: Oct. 9, 2020

(87) PCT Pub. No.: WO2020/244103
PCT Pub. Date: Dec. 10, 2020

(65) Prior Publication Data
US 2023/0118282 A1    Apr. 20, 2023

(30) Foreign Application Priority Data

Jun. 5, 2019 (CN) .......................... 201910488336.X
Jun. 5, 2019 (CN) .......................... 201920859938.7
(Continued)

(51) Int. Cl.
*B60Q 1/068* (2006.01)
*F21S 41/153* (2018.01)
(Continued)

(52) U.S. Cl.
CPC .......... *F21S 41/192* (2018.01); *B60Q 1/0686* (2013.01); *B60Q 1/1423* (2013.01);
(Continued)

(58) Field of Classification Search
CPC ................................ F21S 41/275; F21S 41/40
See application file for complete search history.

(56) References Cited

U.S. PATENT DOCUMENTS

2008/0043485 A1\* 2/2008 Koerner ................... F21S 41/55
362/521
2011/0157865 A1\* 6/2011 Takahashi ................. F21V 9/35
362/259
(Continued)

FOREIGN PATENT DOCUMENTS

| CN | 105444085 A | 3/2016 |
|---|---|---|
| CN | 105605508 A | 5/2016 |

(Continued)

*Primary Examiner* — Eric T Eide
(74) *Attorney, Agent, or Firm* — Volpe Koenig

(57) ABSTRACT

The present disclosure relates to a vehicle lighting system, and discloses a headlight optical element. The headlight optical element includes a light incident portion, a transmission portion and a light emergent portion. The light incident portion includes at least one light incident structure; the transmission portion is arranged between the light incident portion and the light emergent portion, and includes a light transmitting portion located at the center, and light absorbing portions located on the periphery; and the light emergent portion includes a light emergent surface protruding outwards. The headlight optical element has the advantages of simple structure and convenient dimming. The present disclosure further discloses a headlight module adopting the headlight optical element, a vehicle headlight including the headlight module, and a vehicle adopting the vehicle headlight.

8 Claims, 5 Drawing Sheets

(30) Foreign Application Priority Data

Aug. 8, 2019 (CN) .................. 201910730411.9
Aug. 22, 2019 (CN) .................. 201910780200.6

(51) Int. Cl.
| | | |
|---|---|---|
| *F21S 41/19* | (2018.01) | |
| *F21S 41/37* | (2018.01) | |
| *F21S 41/20* | (2018.01) | |
| *F21S 41/43* | (2018.01) | |
| *F21S 41/24* | (2018.01) | |
| *F21S 41/143* | (2018.01) | |
| *F21S 45/47* | (2018.01) | |
| *F21S 41/29* | (2018.01) | |
| *B60Q 1/14* | (2006.01) | |
| *F21W 102/20* | (2018.01) | |
| *F21W 107/10* | (2018.01) | |

(52) U.S. Cl.
CPC .......... *F21S 41/143* (2018.01); *F21S 41/153* (2018.01); *F21S 41/20* (2018.01); *F21S 41/24* (2018.01); *F21S 41/295* (2018.01); *F21S 41/37* (2018.01); *F21S 41/43* (2018.01); *F21S 45/47* (2018.01); *F21W 2102/20* (2018.01); *F21W 2107/10* (2018.01)

(56) References Cited

U.S. PATENT DOCUMENTS

| | | | |
|---|---|---|---|
| 2014/0268846 | A1 | 9/2014 | Nakazato |
| 2015/0367773 | A1* | 12/2015 | Matsumaru ............ F21S 43/14 |
| | | | 362/516 |
| 2019/0063715 | A1 | 2/2019 | Chen et al. |
| 2019/0170315 | A1* | 6/2019 | Matsuda ................ F21S 41/24 |

FOREIGN PATENT DOCUMENTS

| | | |
|---|---|---|
| CN | 108518645 A | 11/2018 |
| CN | 109416161 A | 3/2019 |
| CN | 208817382 U | 5/2019 |

* cited by examiner

HEADLIGHT OPTICAL ELEMENT, HEADLIGHT MODULE, VEHICLE HEADLIGHT AND VEHICLE

CROSS REFERENCE TO RELATED APPLICATIONS

This application is a 35 USC § 371 national stage of international application No. PCT/CN2019/108398, which is entitled "HEADLIGHT OPTICAL ELEMENT, HEADLIGHT MODULE, VEHICLE HEADLIGHT AND VEHICLE", was filed Sep. 27, 2019, and claims priority to Chinese Application No. 201910488336.X, filed on Jun. 5, 2019; Chinese Application No. 201920859938.7, filed on Jun. 5, 2019; Chinese Application No. 201910730411.9, filed Aug. 8, 2019; and Chinese Application No. 201910780200.6, filed Aug. 22, 2019, all of which are incorporated herein by reference as if fully set forth.

FIELD OF THE INVENTION

The present disclosure relates to a vehicle lighting system, in particular to a headlight optical element. In addition, the present disclosure also relates to a headlight module, a vehicle headlight and a vehicle.

BACKGROUND OF THE INVENTION

A headlight module refers to a device or unit capable of achieving one or more vehicle lighting functions after being used independently or in combination. A headlight module commonly used for forming low beam or high beam is provided with primary optical elements (such as reflectors and transparent light guides) and secondary optical elements (such as lenses), and the lenses or structures with functions equivalent to the lenses are taken as optical elements for final light output of the headlight module.

Recently, with the development of vehicle control technology, Matrix headlights have been widely used. Matrix headlight modules can subdivide a high beam lighting area into multiple lighting areas to achieve an ADB function. That is, targets in front of a vehicle can be shielded, other users on the road are prevented from being dazzled, and thus the driving safety is improved.

An existing Matrix headlight module is also provided with primary optical elements and secondary optical elements. The primary optical elements and the secondary optical elements combine light emitted by multiple light sources and project the combined light to the front of the vehicle so as to form an ideal design light pattern. Thus, requirements for the manufacturing precision and assembly precision of the primary optical elements and the secondary optical elements are high, and a vehicle headlight needs to be subjected to a complicated adjusting of light process before leaving the factory to meet design requirements. Both the primary optical elements and the secondary optical elements need to be fixed through mounting brackets, and mounted on a headlight body or a radiator through the mounting brackets. Consequently, the existing Matrix headlight module has the defects of complicated structure, large size, difficult mounting and adjusting of light, high cost and the like.

SUMMARY OF THE INVENTION

The technical problem needing to be solved by the present disclosure is to provide a headlight optical element which replaces existing primary optical elements and secondary optical elements and is simple in structure, small in size, and convenient to mount and adjust.

The technical problem needing to be solved further by the present disclosure is to provide a headlight module. The headlight module is simple in structure, high in mounting precision and good in stability.

The technical problem needing to be solved further by the present disclosure is to provide a vehicle headlight. The vehicle headlight is simple in structure, convenient to adjust and small in size. In addition, another technical problem needing to be solved by the present disclosure is to provide a vehicle, and a headlight of the vehicle is small in size and convenient to adjust.

In order to solve the above technical problems, in the first aspect, the present disclosure provides a headlight optical element including a light incident portion, a transmission portion and a light emergent portion; the light incident portion includes at least one light incident structure; the transmission portion is arranged between the light incident portion and the light emergent portion; the transmission portion includes a light transmitting portion located at the center and light absorbing portions located on the periphery; and the light emergent portion includes a light emergent surface protruding outwards.

Preferably, portions, close to the light incident portion, of the light absorbing portions on a left side and a right side of the transmission portion are parallel to an optical axis and extend towards the light emergent portion; the portions which are close to the light emergent portion get closer to the optical axis while extending towards the light emergent portion; and the reflectivity of inner side surfaces of left sides and right sides of the light absorbing portions is not greater than 20%. According to the preferred technical solution, an incident angle formed when light incident from the light incident portion is emitted to the inner side surfaces of the left sides and the right sides of the light absorbing portions is small, and the light reflectivity of the inner side surfaces of the light absorbing portions can be reduced, so that more light is refracted into the light absorbing portions and absorbed by the light absorbing portions, and therefore stray light formed by reflected light is greatly reduced. In the preferred technical solution, the reflectivity of the inner side surfaces of the left sides and the right sides of the light absorbing portions may be less than 20%, or even less than 5%.

Preferably, the light absorbing portions on an upper side and a lower side of the transmission portion gradually spread in a direction far away from the optical axis while extending from the light incident portion to the light emergent portion. With the preferred technical solution, the restriction of the light incident from the light incident portion in an up-down direction is small, thus, more light can enter the light emergent portion through the light transmitting portion to form a lighting light pattern, and the light utilization rate is increased.

Preferably, the width of a base of the light emergent portion is larger than the width of the adjacent light transmitting portion, and the height of the base of the light emergent portion is greater than the height of the adjacent light transmitting portion. According to the preferred technical solution, more light which enters the light emergent portion through the light transmitting portion is restricted to the range of the light emergent surface, and forms the lighting light pattern through refraction of the light emergent surface. Light directly emitted to side surfaces of the light emergent portion is reduced, so that the situation that light is emitted from the side surfaces of the light emergent portion to form stray light is prevented.

Further preferably, the side surfaces of the light emergent portion gradually get closer to the optical axis while extending from the base of the light emergent portion to the light emergent surface. In the preferred technical solution, by obliquely arranging the side surfaces of the light emergent portion, the incident angle formed when light reflected by the side surfaces of the light emergent portion is emitted to the light emergent surface is smaller, and total reflection is formed more easily. Preferably, the light incident structures include light incident surfaces protruding towards an end. In the preferred technical solution, more light emitted by light sources can be converged by the light incident surfaces protruding towards the end, and light emitted by different light sources advantageously form respective lighting areas.

Preferably, the transmission portion is formed by double-shot molding, the light transmitting portion at the center is injection-molded with a transparent material, and the light absorbing portions on the periphery are injection-molded with a dark material. According to the preferred technical solution, the light transmitting portion and the light absorbing portions can be closely attached to form a single interface, so that the situation that light is reflected for multiple times at interfaces due to loose attachment to form stray light is avoided. The transparent material is beneficial to transmission of light, while the dark material can increase absorption of light.

Preferably, the light transmitting portion is made of transparent plastic or silica gel or glass; and the light absorbing portions are made of black PC. In the preferred technical solution, the plastic may be transparent PMMA (polymethyl methacrylate) or transparent PC (polycarbonate). The material adopted by the light transmitting portion is high in transparency and good in light transmission performance, and is beneficial to passing of more light; and the black PC (polycarbonate) material adopted by the light absorbing portions can absorb more light, and the possibility of light reflection and stray light formation is reduced.

In the second aspect, the present disclosure provides a headlight module including at least one light source, a circuit board, a radiator and the headlight optical element provided in the first aspect of the present disclosure; the light sources are mounted on the circuit board; the headlight optical element is mounted on the radiator through the circuit board; and the light sources correspond to the light incident structures in a one-to-one mode.

Preferably, the portions, close to the circuit board, of the light absorption portions on the left side and the right side of the headlight optical element extend to the two sides respectively so as to form mounting portions, and the headlight optical element is mounted on the radiator through the mounting portions. In the preferred technical solution, by mounting the headlight optical element through the mounting portions, existing mounting brackets used for mounting primary optical elements or secondary optical elements can be removed, the structure of the headlight module is simplified, and meanwhile, the headlight optical element is directly positioned and mounted, so that the mounting precision and stability are improved.

Preferably, the mounting portions are provided with positioning pins, both the circuit board and the radiator are provided with positioning holes, and the positioning pins are positioned in the positioning holes. With the preferred technical solution, the positioning precision of the positioning pins and the positioning holes is higher, and the mounting precision and the mounting stability of the headlight optical element are further improved.

Preferably, the mounting portions are provided with support legs and supported on the circuit board through the support legs. In the preferred technical solution, by arranging the support legs, a contact mode of contact portions of the mounting portions and the circuit board is changed into a point line contact mode from a surface contact mode, and thus the mounting stability of the headlight optical element is improved.

In the third aspect, the present disclosure provides a vehicle headlight. The vehicle headlight includes at least one headlight module provided by the second aspect of the present disclosure.

In the fourth aspect, the present disclosure provides a vehicle adopting the vehicle headlight provided by the third aspect of the present disclosure.

Through the above technical solutions, the headlight optical element of the present disclosure replaces traditional primary optical elements and secondary optical elements with the single optical element, and can project light emitted by the multiple light sources to the front of the vehicle respectively, so that a multi-pixel lighting effect is formed. Since light emitted by the light sources is directly shaped to form a lighting light pattern through the light incident portion, the transmission portion and the light emergent portion which are integrally connected, positioning structures and light adjusting mechanism from the light sources to the primary optical elements and the secondary optical elements are simplified, mounting and adjusting of light is convenient, and the size of the optical element is reduced. Through the structures of the light transmitting portion and the light absorbing portions of the transmission portion, light can be prevented from being emitted from the side surface of the optical element, and meanwhile, the condition that light is reflected by the side surface of the transmission portion and then emitted from the light emergent portion to form stray light is reduced.

According to the headlight module of the present disclosure, light emitted by a plurality of light sources are converged by a plurality of light incident structures and then projected through the headlight optical element of the present disclosure so as to form a multi-pixel lighting light pattern. Through the structure that the headlight optical element is directly mounted on the radiator through the circuit board, the headlight module is simpler in structure, smaller in occupied size and high in mounting precision, and the stability of the headlight optical element is good.

The vehicle headlight of the present disclosure has the same advantages by adopting a vehicle lighting device of the present disclosure.

The vehicle of the present disclosure also has the advantages described above by adopting the vehicle headlight of the present disclosure.

Other features and advantages of the present disclosure will be described in detail in the following specific embodiments.

| Brief Description of the Symbols: | | | |
|---|---|---|---|
| 1 | Headlight optical element | 11 | Light incident portion |
| 111 | Light incident structures | 12 | Transmission portion |
| 121 | Light transmitting portion | 122 | Light absorbing portions |
| 13 | Light emergent portion | 131 | Light emergent surfaces |
| 14 | Mounting portions | 141 | Support legs |
| 142 | Positioning pins | 2 | Light sources |
| 3 | Circuit board | 31 | Circuit board mounting holes |
| 32 | Positioning holes | 4 | Radiator |
| 5 | Screws | 6 | Lighting bright area |
| 7 | Dark area | | | |

DETAILED DESCRIPTION OF THE EMBODIMENTS

In the present disclosure, the orientations or positional relationships indicated by orientation words such as "up, down, left, right, front, and rear" are based on the orientations or positional relationships indicated by the orientation of a vehicle in the normal running state after a headlight optical element or a headlight module or a vehicle headlight is mounted on the vehicle unless otherwise stated.

In the description of the present disclosure, it should be noted that terms "mounting", "arranging" or "connection" should be understood in a broad sense, unless otherwise specified and defined, for example, connection may be fixed connection or detachable connection or integral connection, may be direct connection or indirect connection through an intermediate medium, and may be internal connection of two elements or interaction between the two elements. For ordinary those skilled in the art, the specific meanings of the above terms in the present disclosure can be understood according to specific situations.

Hereunder, the embodiments of the present disclosure will be described in detail with reference to the accompanying drawings. It should be understood that the specific embodiments described here are only provided to illustrate and explain the present disclosure, but will not be deemed as constituting any limitation to the scope of protection of the present disclosure.

Figure 1:
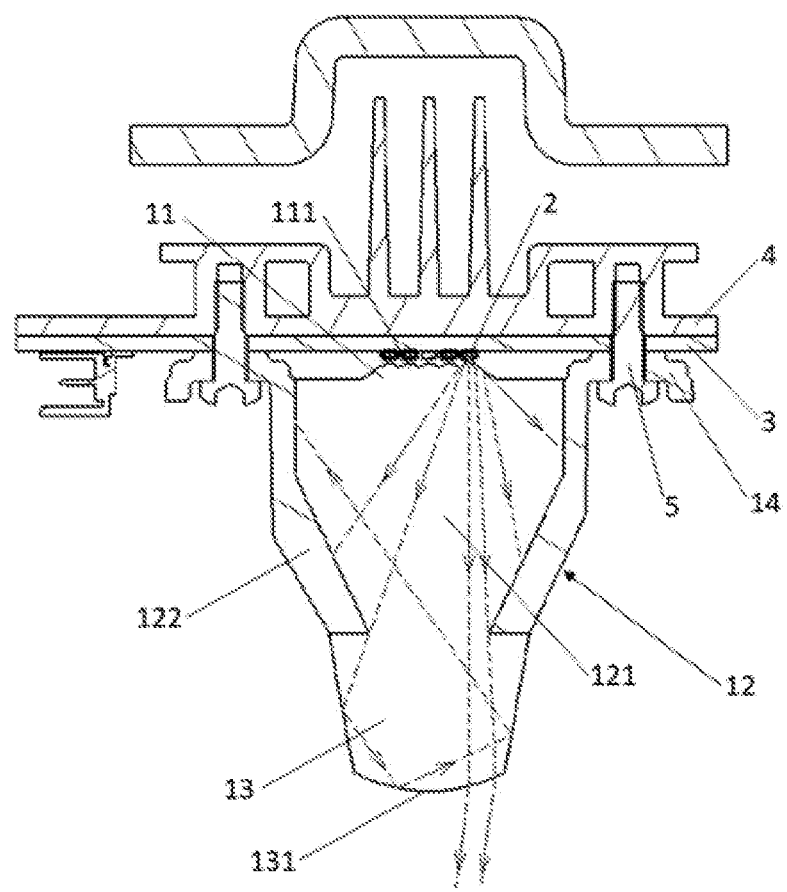
FIG. 1 is a transverse sectional schematic diagram of an embodiment of a headlight module according to the present disclosure.
Figure 2:
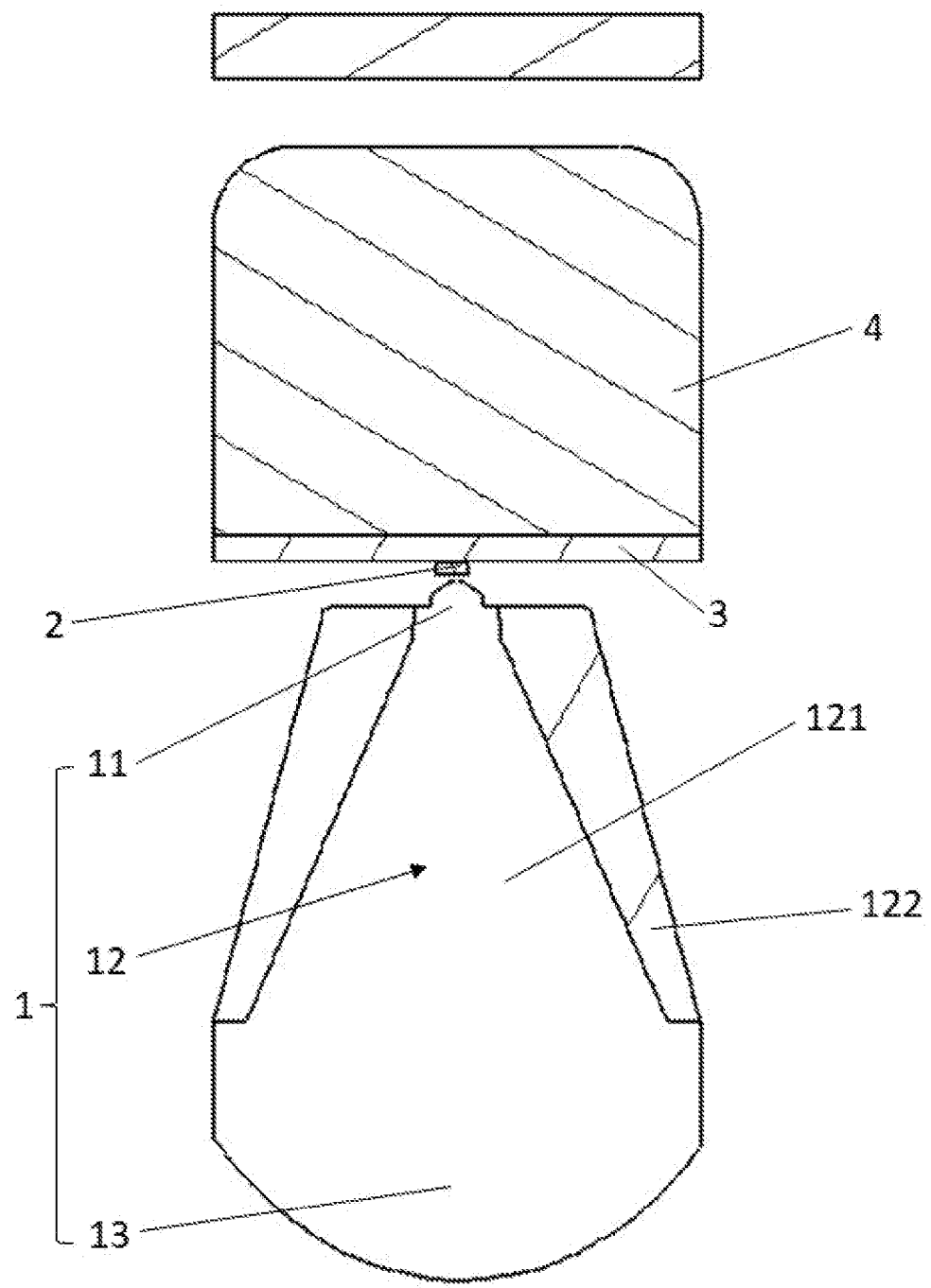
FIG. 2 is a longitudinal sectional schematic diagram of FIG. 1.
Figure 3:
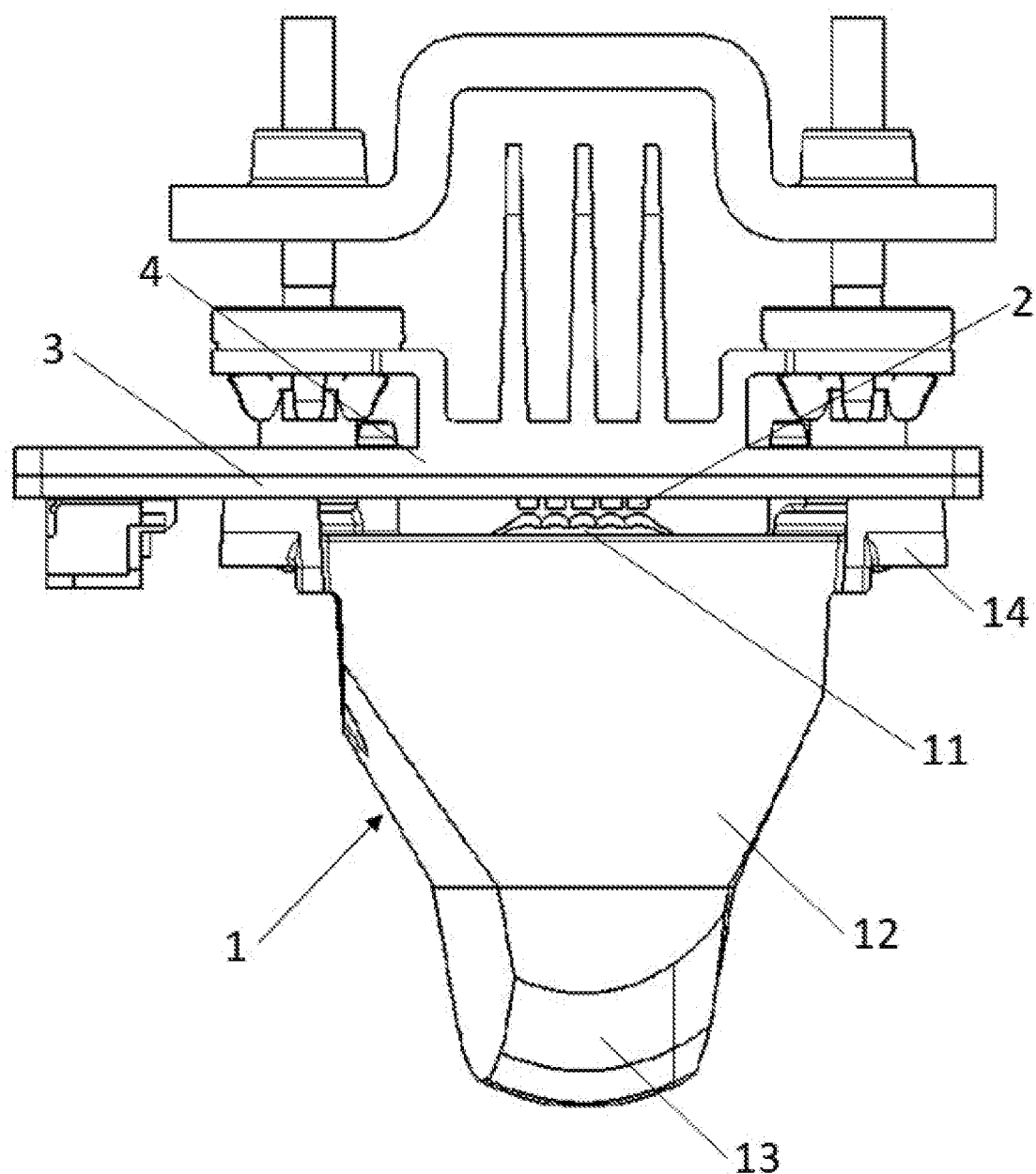
FIG. 3 is a schematic top view of FIG. 1.

As shown in FIGS. 1-3, an embodiment of a headlight optical element of the present disclosure includes a light incident portion 11, a transmission portion 12 and a light emergent portion 13 which are integrally connected. The light incident portion 11 includes at least one light incident structure 111, such as five light incident structures 111, used for introducing light emitted by light sources into the light incident portion 11; the transmission portion 12 is arranged between the light incident portion 11 and the light emergent portion 13 and is used for transmitting light input from the light incident portion 11 to the light emergent portion 12 and preventing light from being emitted from the side surface of the transmission portion 12 or being reflected by the side surfaces of the transmission portion and emitted from the light emergent portion to avoid forming stray light. The transmission portion 12 includes a light transmitting portion 121 located at the center and light absorbing portions 122 located on the peripheral portion. The light transmitting portion 121 is made of a highly transparent material and used for transmitting light introduced by the light incident portion 11 to the light emergent portion 13; the light absorbing portions 122 are made of a light absorbing material and used for absorbing light emitted onto the light absorbing portions 122 and preventing light passing through the light transmitting portion 121 from being emitted through the side surfaces or reflected by the side surfaces of the light transmitting portion 121 to avoid forming stray light. In contrast, side surfaces of existing optical elements are usually coated with black paint for preventing light from being emitted. However, the shading mode by applying black paint is poor in adhesion and affects the attractiveness of headlight optical elements. The side surfaces of the existing headlight optical elements are also provided with leather grains for reducing stray light, but a satisfactory effect of reducing stray light cannot be achieved easily through the technical solution. The light emergent portion 13 includes a light emergent surface 131 protruding outwards, and the light emergent surface 131 and the light incident structures 111 jointly form a convex lens for collecting and collimating incident light and then projecting the collimated light forwards to form a lighting light pattern. After light introduced by the five light incident structures 111 is transmitted through the transmission portion 12 and then projected by the light emergent portion 13, the light can form a light pattern composed of five lighting areas.

In some embodiments of the headlight optical element of the present disclosure, as shown in FIG. 1, the portions, close to the light incident portion 11, of the light absorbing portions 122 on the left and right sides of the transmission portion 12 are parallel to the optical axis and extend to the light emergent portion 13; and the portions, close to the light emergent portion 13, of the light absorbing portions 122 gradually get closer to the optical axis while extending towards the light emergent portion 13. At this time, when light is emitted to the portions, close to the light emergent portion 13, of the light absorbing portions 122 at the same angle, a small incident angle can be formed. The smaller the incident angle of light emitted to an interface, the lower the proportion of reflected light and the higher the proportion of refracted light. Thus, more light is refracted at the interface between the light transmitting portion 121 and the light absorbing portions 122 and is therefore absorbed by the light absorbing portions 122, less light is reflected to enter the light transmitting portion 121 again, wherein less light can be emitted through the light emergent surface 131 to avoid forming stray light. After processing through the technical solution, the reflectivity of the interface between the light transmitting portion 121 and the light absorbing portions 122 can easily reach 20% or below or even 5% or below, so that formation of stray light is effectively suppressed.

Meanwhile, by arranging the light absorbing portions 122, a left-right width of the portion, at the center and close to the light emergent portion 13, of the light transmitting portion 121 is reduced, light emitted to the light absorbing portions 122 is absorbed by the light absorbing portions 122, and the angles of light emitted to the left side and the right side of the light emergent portion 13 is restricted, so that the incident angle formed by light emitted to the right (left) side surface of the light emergent portion 13 is significantly larger than a critical angle for total reflection, and thus total reflection occurs, the light is totally reflected to the light emergent surface 131 of the light emergent portion 13, the light emergent surface 131 is in a spherical shape protruding outwards, and more light reflected from the side surface of the light emergent portion 13 is totally reflected on the light emergent surface 131, and reflected to the left (right) side surface of the light emergent portion 13, and then the above totally reflected light is totally reflected from the left (right) side surface of the light emergent portion 13 back to the light transmitting portion 121 to reach the light absorbing portion 122 on the right (left) side. Since the light absorbing portions 122 can absorb incident light, and the reflectivity of the interface of the light absorbing portions 122 and the light transmitting portion 121 is quite low, most of reflected light is absorbed by the light absorbing portions 122, and less light can be reflected from the interface. In addition, the reflected light emitted from the light emergent portion 13 is rarer, so that stray light is basically eliminated.

As shown in FIG. 1, taking the leftmost light source 2 as an example, part of light emitted by the light source 2 is directly emitted to the light emergent surface 131 of the light emergent portion 13, and projected through the light emergent surface 131 to form a headlight light pattern; part of light is emitted to the interface between the light transmitting portion 121 and the light absorbing portions 122, wherein most of the part of light is absorbed by the light absorbing portions 122, and only a small amount of reflected light is formed; also a small part of remaining light is directly emitted to the right side surface of the light emergent portion 13, and the part of light can be totally reflected to the light emergent surface 131 of the light emergent portion 13, totally reflected from the light emergent surface 131 to the left side surface of the light emergent portion 13, then totally reflected back to the light transmitting portion 121 from the left side surface of the light emergent portion 13, and absorbed by the light absorbing portion 122 on the right side and cannot be emitted from the side surface, and as described above, less light is reflected by right inner side surfaces of the light absorbing portions 122.

In some embodiments of the headlight optical element of the present disclosure, as shown in FIG. 2, the light absorbing portions 122 on the upper and lower sides of the transmission portion 12 gradually extend away from the optical axis while extending from the light incident portion 11 to the light emergent portion 13. Correspondingly, the longitudinal cross section of the light transmitting portion 121 is in a triangular shape, thus, more light introduced from the light incident portion 11 can be transmitted to the light emergent surface 131 of the light emergent portion 13, refracted by the light emergent surface 131, and projected out to form the lighting light pattern. While a small part of light directly emitted to the side surface of the light emergent portion 13 is mostly absorbed by the light absorbing portions 122 through total reflection of the side surface of the light emergent portion 13 and the light emergent surface 131, so that stray light is rarely formed.

In some embodiments of the headlight optical element of the present disclosure, as shown in FIG. 1 and FIG. 2, the width of the base, namely the end connected to the transmission portion 12, of the light emergent portion 13 in the left-right direction is greater than the left-right width of the adjacent light transmitting portion 121, and the up-down height of the base of the light emergent portion 13 is greater than the up-down height of the adjacent light transmitting portion 121. Through the structure, more light entering the light emergent portion 13 through the light transmitting portion 121 can be emitted to the light emergent surface 131 of the light emergent portion 13 and projected by the light emergent surface 131 to form a lighting light pattern, the amount of light emitted from the light transmitting portion 121 to the light emergent portion 131 is reduced, and meanwhile, light emitted to the portion, close to the base, of the side surface of the light emergent portion 13 is restricted, so that the incident angle of light which can reach the side surface of the light emergent portion 13 is larger than the critical angle to form total reflection. The width of the base of the light emergent portion 13 may be the same as the width of the outer side of the adjacent light absorbing portions 122, and meanwhile, the height of the base of the light emergent portion 13 may be the same as the height of the outer side of the adjacent light absorbing portions 122.

It should be noted that the size of the headlight optical element of the present disclosure is related to the number of the light incident structures 111, namely the number of lighting areas which can be formed. The more lighting areas which can be formed, the larger the size of the headlight optical element of the present disclosure. When the headlight optical element of the present disclosure is provided with five light incident structures 111, that is, five lighting areas can be formed, the light emergent surface 131 of the headlight optical element is about 20 mm high and about 10 mm wide, and is much smaller than a lens opening of an existing Matrix headlight, so that the sizes of the headlight module and the headlight can be effectively reduced to be convenient for design of a headlight image.

In some embodiments of the headlight optical element of the present disclosure, as shown in FIG. 1 and FIG. 2, the upper side surface, the lower side surface, the left side surface and the right side surface of the light emergent portion 13 gradually get closer to the optical axis when transmitting from the base of the light emergent portion 13 to the light emergent surface 131 to form a plane inclined towards the optical axis. Through the inclined structure, the incident angle formed by light reflected to the light emergent surface 131 through the side surfaces of the light emergent portion 13 on the light emergent surface 131 is further increased, so that the effect that the incident angle of more light is greater than the critical angle to form total reflection is ensured. Although the inclined structure also reduces the incident angle of light emitted from the light incident portion 11 to the side surfaces of the light emergent portion 13, the inclined structure cannot make the incident angle of the part of the light smaller than the critical angle, so total reflection of the light is not hindered.

As an embodiment of the headlight optical element of the present disclosure, as shown in FIGS. 1-3, the light incident structures 111 are provided with light incident surfaces protruding towards the end, and the light incident surfaces are used for introducing light into the headlight optical element of the present disclosure. The light incident surfaces of the light incident structures 111 may also be arranged as flat surfaces, or be arranged in a light condensing cup shape commonly adopted by light incident ends of traditional primary optical elements, so as to be capable of playing the role of introducing light. However, by adopting the light incident surfaces protruding towards the end of the embodiment, on the one hand, the light incident surfaces can play the role of better collecting incident light, and on the other hand, the light incident surfaces can be matched with the light emergent surface 131 protruding outwards to form a biconvex lens structure, so that the incident light can be better collected, collimated and then projected forwards to form an ideal design light pattern.

In some embodiments of the headlight optical element of the present disclosure, the transmission portion 12 is formed by double-shot molding. The light transmitting portion 121 is made of a transparent plastic material with good light transmission performance by injection molding, may be made of materials such as transparent plastic and silica gel and preferably made of PMMA or PC. The light absorbing portions 122 are made of a dark light absorbing plastic material by injection molding, may be made of dark plastic and preferably made of dark green or black PC.

In some embodiments of the headlight optical element of the present disclosure, the light transmitting portion 121 may be made of transparent plastic, transparent silica gel, or glass, and PMMA or PC is preferably used as the transparent plastic. The light absorbing portions 122 may be made of a black PC material.

Light incident from the light incident portion 11 can be better transmitted to the light emergent portion 13 through the highly transparent materials such as PMMA, PC, silica gel or glass adopted by the light transmitting portion 121, so that transmission loss of light is reduced. The light absorbing portions 122 made of dark plastic such as dark green or black PC can better absorb light emitted onto the light absorbing portions 122 and prevent the light from passing through the light absorbing portions 122 and being emitted from the side surfaces of the light absorbing portions 122. Meanwhile, the dark plastic has a low surface reflectivity, and the condition that light emitted onto the light absorbing portions 122 is reflected by the surfaces of the light absorbing portions 122 and then emitted from the light emergent surface 131 to stray light can be reduced.

A headlight module in an embodiment of the present disclosure is shown in FIGS. 1-5, the headlight module includes at least one light source 2, a circuit board 3, a radiator 4 and a headlight optical element 1 of the present disclosure. The number of the light sources 2 is consistent with the number of the light incident structures 111 on the headlight optical element 1. The light sources 2 can be mounted on the circuit board 3 side by side, and can be driven by power sources arranged on the circuit board 3 to independently emit light. The headlight optical element 1 is mounted on the radiator 4 through the circuit board 3, so that the light incident structures 111 correspond to the light sources 2 in a one-to-one mode, then more light emitted by the light sources 2 can enter the headlight optical element 1 through the corresponding light incident structure 111 and is projected by the headlight optical element 1 to form a lighting light pattern. Through the form that the headlight optical element 1 is mounted on the radiator 4 through the circuit board 3, the relative position of the headlight optical element 1 and the light sources 2 can be fixed on the one hand, and the circuit board 3 and the radiator 4 can be fixed together on the other hand, so that heat generated by the light sources 2 can be better dissipated through the radiator 4, and the light sources 2 are prevented from being damaged due to excessively high temperature.

As an embodiment of the headlight module of the present disclosure, as shown in FIG. 1, FIG. 3, FIG. 4 and FIG. 5, the portions, close to the circuit board 3, of the light absorbing portions 122 on the left and right sides of the headlight optical element 1 extend to the two sides respectively and form mounting portions 14. The headlight optical element 1 is mounted on the radiator 4 through the mounting portions 14. Since the mounting portions 14 and the headlight optical element 1 are integrally formed, the headlight optical element 1 can be stably mounted on the radiator 4 through the mounting portions 14. Primary optical elements and secondary optical elements of existing vehicle headlights are fixed through mounting brackets, the primary optical elements or the secondary optical elements and the mounting brackets are mounted and connected once, and the mounting brackets and the radiator are mounted and connected and. Compared with the existing mounting form, the headlight module has the advantages that mounting brackets are removed, the structure is simpler, and moreover, the headlight optical element 1 and the radiator 4 are mounted and connected only once, so that the positioning precision and the structure stability are higher. By a way of forming mounting holes in the mounting portions 14, circuit board mounting holes 31 in the circuit board 3 and threaded holes in the radiator 4, making screws 5 pass through the mounting holes and the circuit board mounting holes 31, and then rotationally fixing the screws 5 into the threaded holes, the headlight optical element 1 is mounted on the radiator 4.

Figure 5:
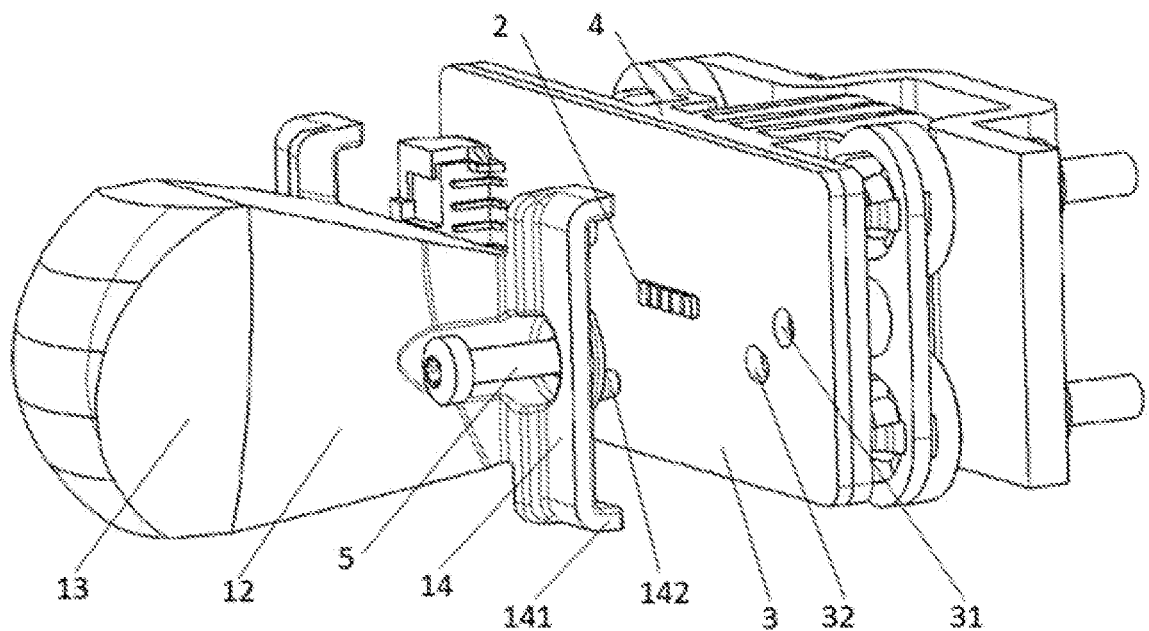
FIG. 5 is a part exploded schematic diagram of FIG. 4.

In some embodiments of the headlight module of the present disclosure, as shown in FIG. 5, positioning pins 142 are arranged on the sides, opposite to the circuit board 3, of the mounting portions 14; positioning holes 32 are formed in the circuit board 3 and the radiator 4; the positioning pins 142 are positioned in the positioning holes 32 when the headlight optical element 1 and the radiator 4 are mounted and connected, so that the relative position between the headlight optical element 1, the circuit board 3 and the radiator 4 is more accurate and stable, then the accuracy and stability of the lighting areas formed by light emitted by the light sources 2 are ensured, and therefore the accuracy and stability of the whole lighting light pattern are ensured.

Figure 4:
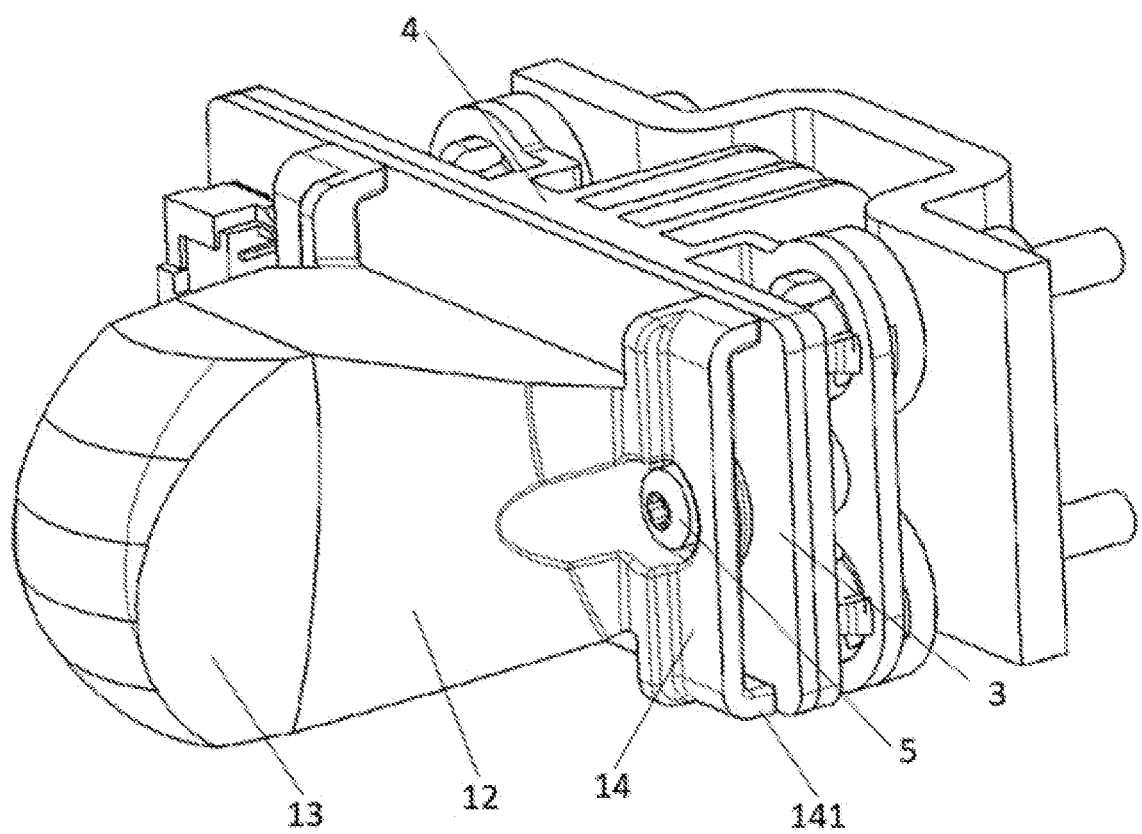
FIG. 4 is a stereostructure schematic diagram of FIG. 1.

In some embodiments of the headlight module of the present disclosure, as shown in FIG. 4 and FIG. 5, the mounting portions 14 are provided with support legs 141. When the headlight optical element 1 is mounted on the radiator 4, the headlight optical element 1 is supported on the circuit board 3 through the support legs 141, so that the position of the headlight optical element 1 is fixed. Point-line combined support between the mounting portions 14 and the circuit board 3 is formed through the support legs 141 and the screws 5, and shaking caused by uneven contact surfaces during surface contact support can be avoided, so that the mounting stability is improved.

Figure 6:
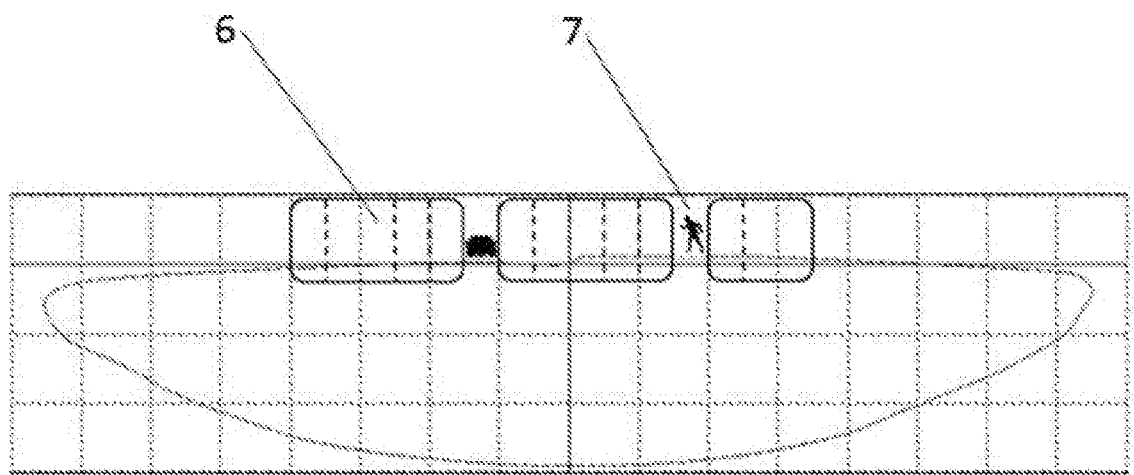
FIG. 6 is a light pattern schematic diagram of a vehicle headlight according to the present disclosure.

A vehicle headlight in an embodiment of the present disclosure includes at least one headlight module of the present disclosure, such as three headlight modules. In the case that the vehicle headlight is provided with three headlight modules and each headlight module is provided with five light sources 2, the vehicle headlight may form fifteen lighting areas, and the fifteen lighting areas combine into the light pattern of the vehicle headlight, and the light pattern is equivalent to a Matrix headlight composed of fifteen pixels, and thus subdivided lighting of fifteen areas can be achieved. As shown in FIG. 6, fifteen light sources 2 of the vehicle headlight can form fifteen lighting bright areas 6, when vehicles or pedestrians appear at positions where some lighting bright areas 6 of the lighting areas in front of the vehicle headlight are located, the light sources 2 corresponding to the corresponding lighting bright areas 6 can be turned off to form dark areas 7 in target areas, and light is prevented from dazzling other traffic participants and affecting traffic safety. The number of the lighting areas (pixels) can be changed by changing the number of the light sources 2 in the headlight module and/or the number of headlight modules in the vehicle headlight so as to achieve a lighting effect of the Matrix headlight with different pixels. Since the primary optical elements and the secondary optical elements are no longer adopted by the vehicle headlight simultaneously, a complicated adjusting of light process is no longer required. Positioning between the optical element and the light sources is more accurate. Meanwhile, corresponding mounting brackets are removed, and thus the vehicle headlight is simpler in structure and smaller in size.

A vehicle of the present disclosure also has the beneficial effects of the vehicle headlight in the above embodiments by adopting the vehicle headlight of the present disclosure.

In the description of the present disclosure, the description with reference to terms "one embodiment", "some embodiments", "an implementation" and the like means that the specific features, structures, materials or features described in connection with the embodiments or examples are included in at least one embodiment or example of the present disclosure. In the present disclosure, the schematic expressions of the above terms do not necessarily refer to the same embodiment or example. Furthermore, the specific features, structures, materials or features described may be combined in any one or more embodiments or examples in any proper mode.

The preferred embodiments of the present disclosure have been described in detail above with reference to the accompanying drawings, but the present disclosure is not limited thereto. Within the scope of the technical concept of the present disclosure, various simple modifications can be made to the technical solutions of the present disclosure, including the combination of various specific technical features in any proper mode. In order to avoid unnecessary repetition, various possible combinations are not described separately in the present disclosure. However, the simple modifications and combinations should also be regarded as the content disclosed by the present disclosure, and fall into the protection scope of the present disclosure.

The invention claimed is:

1. A headlight optical element, comprising a light incident portion, a transmission portion and a light emergent portion, wherein the light incident portion comprises at least one light incident structure; the transmission portion is arranged between the light incident portion and the light emergent portion; the transmission portion comprises a light transmitting portion located at the center and light absorbing portions located on the periphery; and the light emergent portion comprises light emergent surfaces protruding outwards;

wherein portions, close to the light incident portion, of the light absorbing portions of a left side and a right side of the transmission portion extend to the light emergent portion while being parallel to an optical axis; portions close to the light emergent portion gradually get closer to the optical axis while extending to the light emergent portion; and reflectivity of inner side surfaces of left sides and right sides of the light absorbing portions is not higher than 20%; or the light absorbing portions on an upper side and a lower side of the transmission portion gradually extend far away from the optical axis while extending from the light incident portion to the light emergent portion.

2. The headlight optical element according to claim 1, wherein a width of a base of the light emergent portion is greater than a width of the adjacent light transmitting portion, and a height of the base of the light emergent portion is greater than a height of the adjacent light transmitting portion.

3. The headlight optical element according to claim 2, wherein a side surface of the light emergent portion gradually gets closer to the optical axis while extending from the base of the light emergent portion to the light emergent surface.

4. The headlight optical element according to claim 1, wherein the light incident structures comprise light incident surfaces protruding towards an end.

5. The headlight optical element according to claim 1, wherein the transmission portion is formed by double-shot molding, the light transmitting portion at the center adopts injection molding with a transparent material, and the light absorbing portions on the periphery adopts injection molding with a dark material; or, the light transmitting portion is made of transparent plastic or silica gel or glass; and the light absorbing portions are made of black PC.

6. A headlight module, comprising at least one light source, a circuit board, a radiator and the headlight optical element according to any one of claims 1 and 2-5, wherein the light sources are mounted on the circuit board; the headlight optical element is mounted on the radiator through the circuit board; and the light sources correspond to the light incident structures in a one-to-one mode.

7. The headlight module according to claim 6, wherein portions, close to the circuit board, of the light absorbing portions of a left side and a right side of the headlight optical element extend to the two sides correspondingly so as to form mounting portions, and the headlight optical element is mounted on the radiator through the mounting portions.

8. A vehicle headlight, comprising at least one headlight module according to claim 6.

* * * * *